United States Patent [19]

Bäbler

[11] 4,305,873

[45] Dec. 15, 1981

[54] PROCESS FOR CONVERTING A PIGMENT INTO ANOTHER MODIFICATION VIA LIQUID ALKYLAMINE TREATMENT

[75] Inventor: Fridolin Bäbler, Allschwil, Switzerland

[73] Assignee: Ciba-Geigy Corporation, Ardsley, N.Y.

[21] Appl. No.: 76,692

[22] Filed: Sep. 18, 1979

Related U.S. Application Data

[63] Continuation of Ser. No. 873,583, Jan. 30, 1978, abandoned.

[30] Foreign Application Priority Data

Feb. 3, 1977 [CH] Switzerland ................ 1317/77

[51] Int. Cl.$^3$ .............. C09B 43/00; C09B 46/00; C09B 67/48; C09B 67/52
[52] U.S. Cl. ................ 260/152; 106/288 Q; 106/308 Q; 106/308 N; 106/309; 260/157; 260/208; 260/326 N; 546/49
[58] Field of Search ........... 260/208, 152, 157, 158, 260/165, 326 N; 106/288 Q, 308 Q, 308 N, 309; 546/49

[56] References Cited

U.S. PATENT DOCUMENTS

| | | | |
|---|---|---|---|
| 1,992,185 | 4/1935 | Calcott et al. ................ | 8/6 |
| 3,016,384 | 1/1962 | Caliezi ................ | 260/314.5 |
| 3,109,842 | 11/1963 | Schilling et al. ................ | 260/157 |
| 3,256,285 | 6/1966 | Kirsch ................ | 260/279 |
| 3,328,384 | 6/1967 | Pietz et al. ................ | 260/157 |
| 3,555,003 | 1/1971 | Ribka ................ | 260/157 |
| 3,759,733 | 9/1973 | Bradley ................ | 106/309 |
| 3,776,749 | 12/1973 | Mc Kay ................ | 106/288 Q |
| 3,951,678 | 4/1976 | Wanser ................ | 106/308 N |
| 3,976,649 | 8/1976 | Fabian et al. ................ | 106/288 Q |
| 4,045,425 | 8/1977 | Hunter ................ | 260/208 X |

FOREIGN PATENT DOCUMENTS

| | | | |
|---|---|---|---|
| 40-50699 | of 1965 | Japan ................ | 260/157 |
| 900757 | 7/1962 | United Kingdom ........... | 106/288 Q |

OTHER PUBLICATIONS

Iwamoto et al., Chemical Abstracts, vol. 85, No. 22846m (1976).

*Primary Examiner*—Floyd D. Higel
*Attorney, Agent, or Firm*—Harry Falber

[57] ABSTRACT

A process for converting a pigment or disperse dye into another modification by treating the colorant with a liquid alkylamine and removing the treatment agent by evaporation after the conversion into the modification.

The pigments afforded by the instant process are used in the same way as the untreated colorants for pigmenting materials of high molecular weight.

4 Claims, No Drawings

PROCESS FOR CONVERTING A PIGMENT INTO ANOTHER MODIFICATION VIA LIQUID ALKYLAMINE TREATMENT

This is a continuation of application Ser. No. 873,583 filed on Jan. 30, 1978, now abandoned.

The invention relates to a process for converting a pigment or disperse dye into another modification by treating the colourant with a liquid alkylamine and removing the reagent by evaporation after the conversion.

Various processes for converting a pigment or disperse dye into another modification either to improve the tinctorial properties or to change the shade are already known. One known method is to dissolve the colourant in an organic or inorganic solvent and to precipitate it again from the solution by crystallisation or precipitation. In the same way, organic solvents are used which do not dissolve the pigment, but effect the modification under the influence of time and temperature.

Japanese published patent application No. 225526/76 for example describes a process for improving the tinctorial properties of an isoindolinone pigment, especially the colour strength, gloss and transparency, by dissolving the pigment in a mono- or dialkylamine, precipitating it in the form of the amine salt by the addition of water, cleaving the amine salt by heating, and separating the amine from the pigment again. In this process, the pigment is recovered in the starting modification. A change in the modification, for example of the linear quinacridone into the γ-modification, occurs however by treating the corresponding α-form in accordance with the process of Japanese published patent application No. 50699/65 with an aliphatic polyamine of the formula $NH_2(R-NH)_nH$, wherein R represents a linear saturated aliphatic radical and n is an integer from 1 to 4, at elevated temperature.

Compared with the process of Japanese published patent application No. 25526/76, the process of the present invention has the advantage that, without dissolving the pigment beforehand in a liquid alkylamine and precipitating it with water, another modification of the colourant is obtained only by removing the reagent by evaporation, and the advantage compared with the process of Japanese published patent application No. 50699/65 consists in the fact that, in order to effect a conversion into another modification, a simple liquid alkylamine is used instead of a polyamine for the treatment and elevated temperatures are not necessary.

Preferably, the pigments or disperse dyes to be converted into another modification by the process of the present invention are those of the isoindolinone, azo, metal complex, quinophthalone and quinacridone series, and the other modification can be either an already known or also a hitherto unknown modification.

In the treatment with a liquid alkylamine, the colourant is suspended in the reagent and stirred until the conversion into the other modification is complete. This procedure can take both hours and sometimes only seconds and is often detectable by the change in colour. The modification is isolated by filtration and subsequent removal of the alkylamine by evaporation or by direct evaporation thereof. Optionally, the colourant is partially or also completely dissolved in the reagent. In this case, the reagent is removed by direct evaporation, whereupon the dissolved colourant precipitates in the new modification and is isolated. If the colourant is only partially dissolved, then filtration can first be carried out and the two colourant fractions isolated separately from the filter residue or the filtrate.

In particular cases, the treatment according to the invention of the colourants can cause them to be obtained in such microcrystalline form that they are amorphous in X-ray analysis. By increasing the size of the microcrystals, for example by treatment with organic liquids, they can be converted into a dimension in which the new modification can be detected by X-ray diffraction analysis.

As liquid alkylamines it is advantageous to use those of the formula $R_1-NH-R_2$, wherein $R_1$ represents hydrogen or a methyl or ethyl group and $R_2$ represents a methyl, ethyl, n-propyl, isopropyl or sec- or tert-butyl group, whilst $R_1$ and $R_2$ together contain only 1 to 4 carbon atoms. Preferably methylamine, ethylamine or dimethylamine are used. Provided the presence of small amounts of water and/or organic solvents does not exert a negative influence on the conversion into the new modification, these substances can also be tolerated. However, the treatment is preferably carried out in the absence of water and/or an organic solvent.

The modifications are usually obtained in a form which permits them to be used for application without prior special conditioning. In relation to the shade of the colourants before the treatment, the modifications often exhibit a change in shade after the treatment and isolation, thereby affording the possibility of obtaining new colour effects and optionally other fastness properties with the same compounds, but in another modification.

The modifications of the pigments or disperse dyes can be used in the same way as the untreated colourants for pigmenting or dyeing. The pigments are particularly suitable for pigmenting material of high molecular weight, for example cellulose ethers and esters, such as ethyl cellulose, nitrocellulose, cellulose acetate, cellulose butyrate, natural resins or synthetic resins, such as polymerisation resins, polyaddition resins or condensation resins, for example aminoplasts, especially urea-/formaldehyde and melamine/formaldehyde resins, alkyd resins, phenolic plastics, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, singly or in mixtures. It is immaterial whether the above compounds of high molecular weight are in the form of plastic masses, melts or of spinning solutions, lacquers, paints or printing inks. Depending on the end-use, it is advantageous to use the modifications as toners or in the form of preparations.

Throughout the following Examples the parts are by weight, unless otherwise stated. The relationship between parts by weight and parts by volume is the same as that between the gram and the cubic centimeter. Wherever it is not quite clear whether the modifications are hitherto unknown or known ones, they are designated A,B and C to distinguish the difference in the modifications.

EXAMPLES 1–8

A stirring vessel which is cooled with dry ice is charged with 10 parts of the colourant to be treated (see subsequent table) and about 120 parts by volume of liquid methylamine (from a pressure flask). The mixture is then stirred until the conversion into the modification is complete, which usually takes from 4 to 60 minutes.

The methylamine is then evaporated off by heating and any traces still remaining are removed in vacuo at 100° show in many cases interesting results and often a favourable change in their application properties.

TABLE

| Exp. | Formula of the pigment | Modification of the starting pigment | Modification of the pigment treated with methylamine |
|---|---|---|---|
| 1 | (bis-isoindolinone structure with OCH₃, CH₃O, NH, Cl₄) | α | γ hitherto unknown |
| 2 | (bis-isoindolinone structure with Cl, Cl, NH, Cl₄) | α | γ hitherto unknown |
| 3 | COOH–Ar–N=N–CH(CO-CH₃)–COHN–Ar–(N,N,C=O,H ring) | A | C |
| 4 | CF₃–Ar–N=N–CH(CO-CH₃)–COHN–Ar–(N,N,C=O,H ring) | A | C |
| 5 | Naphthol azo structure with OCH₃, CH₃, SO₂NHCH₃, OH, COHN–Ar–(N,N,C=O,H ring) | A | B |
| 6 | (quinacridone-type structure with NH, O) | β | α known |
| 7 | (bis-isoindolinone with OCH₃, N=N, NH, Cl₄) | α | γ hitherto unknown |
| 8 | (bis-isoindolinone with CH₃, N=N, NH, Cl₄) | α | β hitherto unknown |

C. The methylamine-free pigment is pulverised. The X-ray diffraction pattern of the treated colourant shows a changed spectrum in comparison with the starting pigment. It is another, in many cases hitherto unknown, modification. The test of the application characteristics of the resulting modifications, which often exhibit a change in shade compared with the starting colourants,

EXAMPLE 9

The β-modification is also obtained by treating 6 parts of the pigment used in Example 8 with ethylamine instead of with methylamine by an analogous procedure.

EXAMPLE 10

The β-modification is also obtained by treating 6 parts of the pigment used in Example 8 with dimethylamine instead of with methylamine by an analogous procedure.

EXAMPLE 11

The orange-yellow β-modification is obtained by using the red pigment (α-modification) of the formula

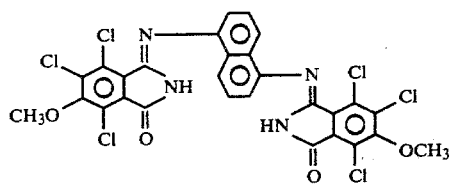

instead of the pigment used in Example 9 and repeating the procedure described therein.

EXAMPLE 12

The orange-yellow β-modification is also obtained by using the red α-modification of the pigment used in Example 11 and repeating the procedure described in Example 10.

EXAMPLE 13

6 parts of the red pigment (α-modification) used in Example 11 are stirred in 40 parts by volume of diethylamine for 8 hours at room temperature. The suspension is filtered and the filter cake is freed at 70° C. in vacuo from diethylamine, yielding also the orange-yellow β-modification.

EXAMPLE 14

6 parts of the red pigment (α-modification) used in Example 11 are stirred in 40 parts by volume of n-propylamine for 24 hours at room temperature, in the course of which the colour of the suspension changes from red to orange-yellow. The suspension is filtered and the filter cake is freed from any n-propylamine still remaining at 70° C. in vacuo. X-ray analysis revealed a mixture of the α- and β-modification.

What is claimed is:

1. A process for converting a pigment selected from the group consisting of isoindolinone, azo, quinophthalone, metal complex and quinacridone pigments into another crystalline modification, which consists essentially of suspending the pigment in a liquid alkylamine of the formula $R_1$—NH—$R_2$, wherein $R_1$ is hydrogen, methyl, or ethyl and $R_2$ is methyl, ethyl, n-propyl, isopropyl, sec-butyl or tert-butyl, provided $R_1$ and $R_2$ contain a total of 1 to 4 carbon atoms, in the absence of water, stirring the suspension until conversion into the other modification is complete and isolating the crystalline modification by direct evaporation of the alkylamine.

2. A process for converting a pigment selected from the group consisting of isoindolinone, azo, quinophthalone, metal complex and quinacridone pigments into another crystalline modification, which consists essentially of suspending the pigment in a liquid alkylamine of the formula $R_1$—NH—$R_2$, wherein $R_1$ is hydrogen, methyl, or ethyl and $R_2$ is methyl, ethyl, n-propyl, isopropyl, sec-butyl or tert-butyl, provided $R_1$ and $R_2$ contain a total of 1 to 4 carbon atoms, in the absence of water, stirring the suspension until conversion into the other modification is complete and isolating the crystalline modification by filtration and subsequent evaporation of the alkylamine.

3. A process as claimed in claim 1 or claim 2 wherein the pigment is treated with liquid methylamine, ethylamine and dimethylamine.

4. A process as claimed in claim 1 or claim 2 wherein undissolved pigment is isolated and freed from solvent before the alkylamine is removed by evaporation.

* * * * *